United States Patent [19]

Kamel et al.

[11] Patent Number: 6,061,720
[45] Date of Patent: May 9, 2000

[54] SEAMLESS SCALABLE DISTRIBUTED MEDIA SERVER

[75] Inventors: Ibrahim Mostafa Kamel, Monmouth Junction; Walid G. Aref, New Brunswick; Sarit Mukherjee, Lawrenceville, all of N.J.

[73] Assignee: Panasonic Technologies, Inc., Princeton, N.J.

[21] Appl. No.: 09/181,015

[22] Filed: Oct. 27, 1998

[51] Int. Cl.[7] .................................................. G06F 13/00

[52] U.S. Cl. ............................................................. 709/219

[58] Field of Search ..................................... 709/200, 201, 709/203, 218, 219, 232

[56] References Cited

U.S. PATENT DOCUMENTS 5,671,225  9/1997  Hooper et al. ........................... 370/468
5,717,854  2/1998  Hiroichi et al. ......................... 709/219

Primary Examiner—Robert B. Harrell
Attorney, Agent, or Firm—Harness, Dickey & Pierce, P.L.C.

[57] ABSTRACT

The distributed multimedia server employs modular server elements that connect with client systems through a high bandwidth network. The server elements are connected in interleaved fashion with the switching elements and the data representing different media selections are arranged in stripe groups distributed across the server elements. The server can be as small as a single server element or grown incrementally, as needed, by connecting additional server elements to the system. Multiple copies of hot media selections are stored across the distributed architecture within different stripe groups to minimize bottlenecks within the storage subsystem.

15 Claims, 5 Drawing Sheets

SEAMLESS SCALABLE DISTRIBUTED MEDIA SERVER

BACKGROUND AND SUMMARY OF THE INVENTION

The present invention relates generally to distributed multimedia servers. More particularly, the invention relates to a scalable media server architecture that can be scaled up to support more users as demand grows. The architecture is balanced to avoid bottlenecks while supporting heavy loads.

The term "global village" describes how today's technology has made it possible to send information instantly from one point on the globe to another. The information infrastructure that makes this possible is currently being built. It is anticipated that someday multimedia material of every description will be delivered anywhere on the globe upon demand.

The foregoing vision implies exponential growth. If the past growth in internet usage is any indicator, we can expect exponential growth in the multimedia server infrastructure as digital multimedia delivery replaces the current analog delivery and as the global village becomes a reality.

Scalability is very important if we are to meet this exponentially growing demand. A system is scalable if it supports more streams when extra hardware is added. In this context, a stream may comprise video content, audio content, data representing other types of information, or a combination of these. Thus a scalable server is one that can be upgraded with additional hardware to support additional streams as more users are added. Linear scale-up is achieved when doubling the hardware capacity enables the server to support the twice the number of streams.

Developing a scalable distributed media server presents several problems that must be solved. Bandwidth bottlenecks are a frequent source of problems. System cost is a competing factor. Increasing component bandwidth by using more expensive components may not be economically practical.

User considerations present further problems in achieving a scalable design. Not all multimedia content is created equal. Some movies, for example, are very popular and are frequently requested throughout the day, with peak demand occurring at certain prime times. Other movies are requested less often, but they still need to be made available for selection by the occasional user. As the popularity of media selections will change over time, the scalable architecture must be similarly flexible in this regard. The problem is compounded further because new media selections are continually being added.

The present invention provides a scalable, distributed media server architecture that addresses the above concerns through a modular approach. Individual server elements, each having a plurality of network interface circuits and a plurality of media storage devices form the information storage component of the architecture. A plurality of switching elements are connected to the server elements in interleaved fashion to define a distributed network.

A single server element can be used to supply media to a small number of users. However, the architecture is readily scaled to accommodate larger numbers of users by simply adding more server elements and associated switching elements. The interleaved connections between server elements and switching elements support a balanced distributed server system.

To further balance the system and avoid bottlenecks, a data structure associated with the media storage devices organizes the devices into stripe groups. The stripe groups are arranged so a given media selection is assigned to one stripe group and is thereby stored, in distributed fashion, across the collection of server elements. Heavily demanded selections are stored as multiple copies, where each copy is assigned to a different stripe group. The result is a highly balanced, scalable media server system that takes full advantage of the available bandwidth of its constituent components.

For a more complete understanding of the invention, its objects and advantages, refer to the following specification and to the accompanying drawings.

DETAILED DESCRIPTION OF THE PREFERRED EMBODIMENTS

Figure 1:
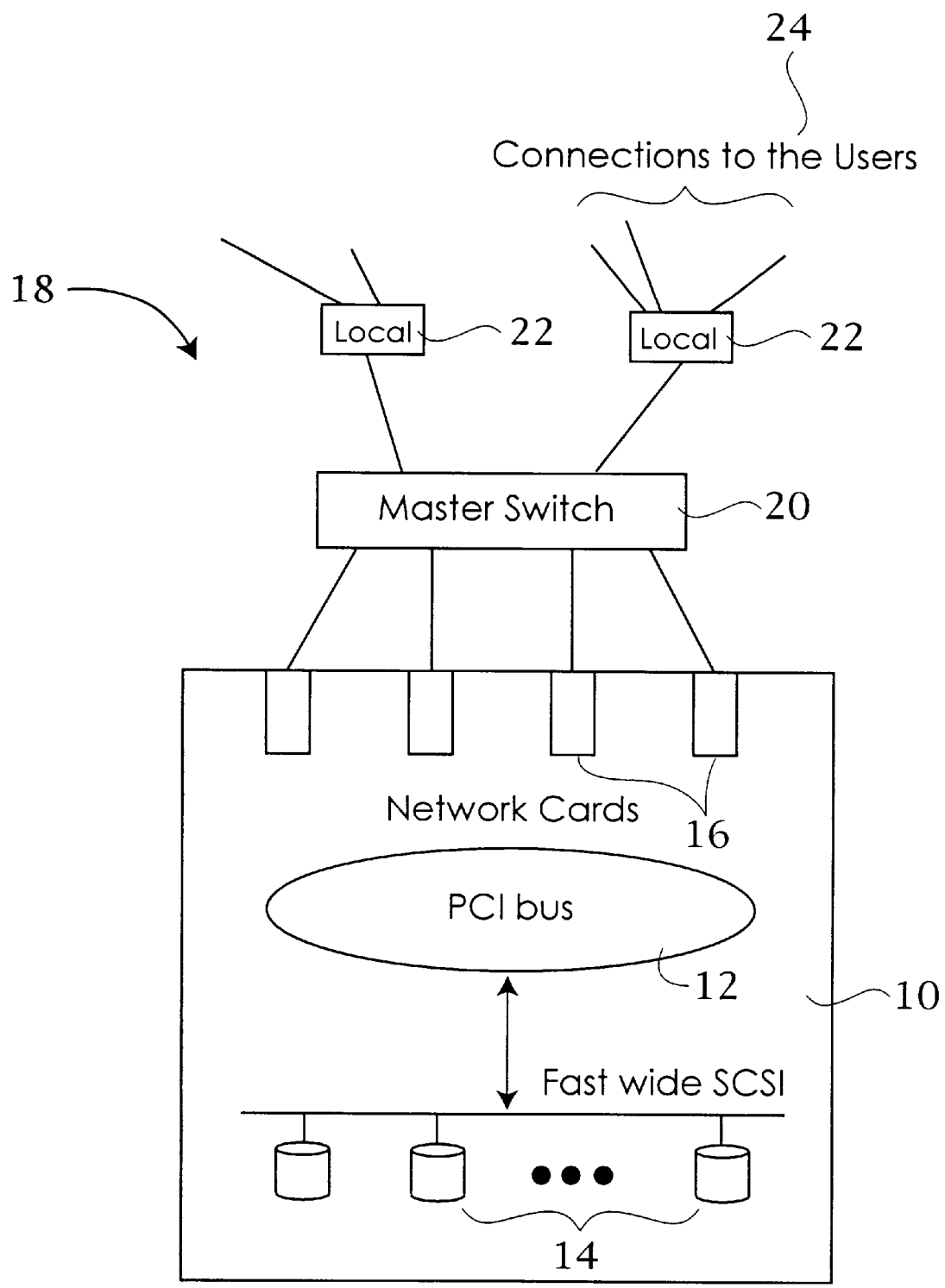
FIG. 1 is a client-server network diagram illustrating the presently preferred manner of connecting the server element to a plurality of client systems.

FIG. 1 illustrates a presently preferred architecture for implementing the scalable server of the invention. The scalable media server is a distributed media server made up of modular units called server elements. A single server element 10 is illustrated in FIG. 1. A single server element can be used to provide media content to a small number of users. In practice, multiple server elements are combined, as described below, to construct the scalable distributed media server system.

The server element 10 may be fabricated using off-the-shelf computer components. The illustrated embodiment employs a PCI bus 12 to which a plurality of media storage devices 14 are attached via a suitable interface, such as a fast wide SCSI interface. The media storage devices 14 may be disk drives or the like. Attached to PCI bus 12 are a plurality of network interface circuits 16. These may be off-the-shelf network cards, such as Ethernet cards, for example. Four network interface circuits have been shown in FIG. 1 for illustration purposes. The number of network cards is variable, depending on the application and upon the respective bandwidths of the components utilized.

Server element 10 is coupled to a switching circuit matrix shown generally at 18. In the presently preferred embodiment network cards 16 are coupled to a master switch or hub 20 and the master switch or hub is in turn coupled to a plurality of local switches or local hubs 22. The local switches or local hubs are in turn coupled to a plurality of individual client systems 24. For purposes of this disclosure, the terms switch and hub are used interchangeably. The master switch and local switches can be off-the-shelf Ethernet switching circuits available from a variety of sources.

Figure 2:
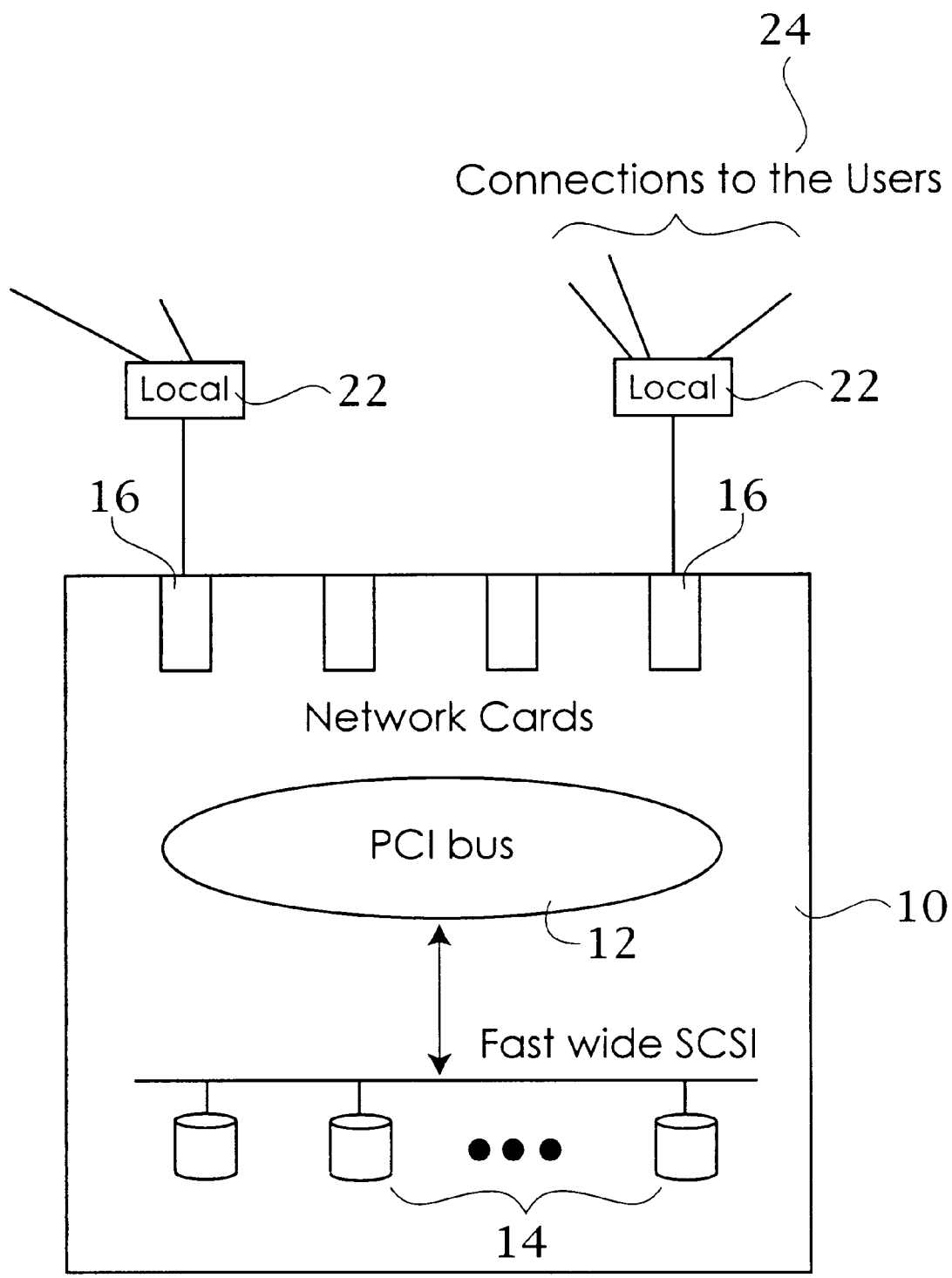
FIG. 2 illustrates an alternate client-server network configuration.

While the switching circuit matrix employing master switch 20 is presently preferred, an alternate configuration is illustrated in FIG. 2. In the alternate configuration the master switch is dispensed with and the individual network cards 16 are each coupled directly to a dedicated local switch 22. The local switches, in turn, support groups of connections to client systems 24. In the alternate embodiment data streams are switched to the client systems in the PCI bus 12. The alternate arrangement is somewhat cheaper, because it dispenses with the master switch. However, in some applications the alternate embodiment may pose limitations in that the bandwidth of each connection is limited by the maximum bandwidth of one network card. In contrast, the preferred embodiment of FIG. 1 enjoys the maximum bandwidth of the entire set of network cards taken collectively.

By way of illustration, assume that two client systems are connected to the same network cards in one server element and that each requires 100 Mbs (Megabits per second). Also assume that the maximum bandwidth of each network interface circuit is 150 Mbs. The embodiment of FIG. 1 can fulfill both requests because each local switch/hub can get data from multiple network cards. In contrast, the embodiment of FIG. 2 cannot fulfill both requests, even though the server element has enough bandwidth to serve both clients. In the embodiment of FIG. 2 the maximum bandwidth (150 Mbs) is insufficient to support the two 100 Mbs streams simultaneously because the two clients are connected to the same network card.

Although one server element can be used as a standalone server, multiple server elements can be readily connected together to form a more powerful server to meet an increased demand. The scalable architecture of the invention may be scaled up linearly. That is, two server elements can provide twice as many streams as one server element.

Figure 3:
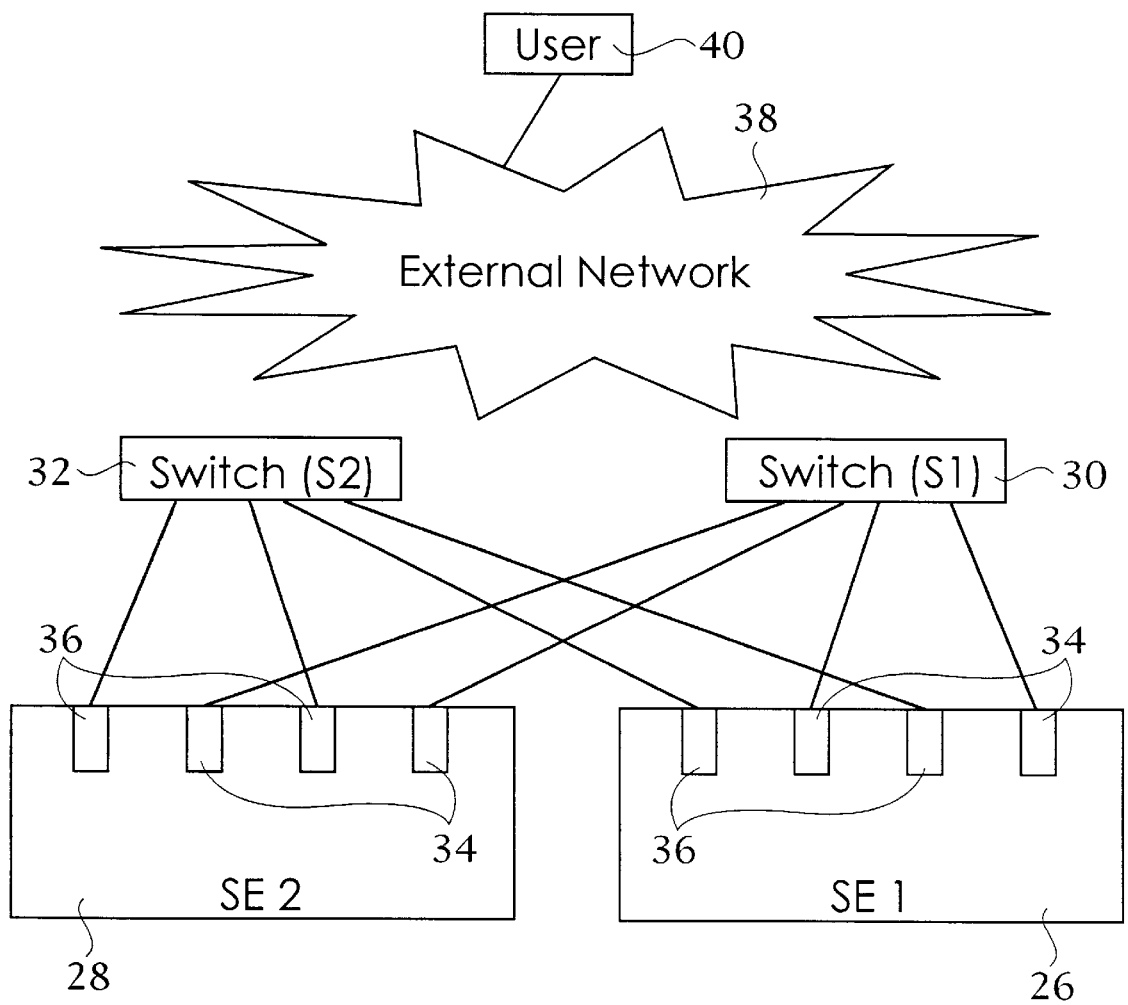
FIG. 3 illustrates how the server elements and switching elements are interleaved in accordance with the invention.

FIG. 3 illustrates the manner in which multiple server elements are interconnected to form a larger server. The server elements 26 and 28 are connected to the pair of master switches 30 and 32 in an interleaved fashion. Specifically, the network interface circuits are arranged as interdigitated groups (e.g., even group 34 and odd group 36). The even group is connected to master switch 30, while the odd group is connected to master switch 32. Master switches 30 and 32 are in turn coupled to the external network 38 comprising the collection of local switches and client systems. A user 40 of the multiple element server merely connects to one of the client systems within the external network 38. The media stream is supplied to the user from both server elements, in the manner described below, without the user being aware that multiple server elements are involved.

The presently preferred embodiment provides a symmetric connection between users and server elements. The objective is avoid possible bottlenecks in the server elements and in the associated network. In most practical applications, different media selections, such as different movies, may be stored on different server elements, and not all movies have the same request frequency.

To understand how load balancing is achieved, consider the two server element systems illustrated in FIG. 3. In this regard, it should be recognized that a system may be configured using a larger number of server elements; thus the present illustration is not intended as a limitation upon the scope of the invention as set forth in the claims. In the present illustration, each server element has four network interface circuits (although a different number could also be employed). The number of master switches (in this case two) is equal to the number of server elements. Thus the advantage of the interleaved connection illustrated is that switches 30 and 32 encounter the same traffic, regardless of the difference on load experienced by server elements 26 and 28. In this configuration, perfect load balance can be achieved where the number of network interface circuits equals four and the number of server elements also equals four.

In the more general case, where the system employs S server elements, each containing $N_K$ network interface circuits, and where there are W master switches (W not necessarily being equal to S) the following holds:

(1) K=1

(2) For each NICj in $SE_K$, (3) Connect each NIC to a port in a different switch in a round-robin fashion until all NICs in $SE_K$ are connected (4) Increment K, go to (2)

Each switch $SW_i$ has $P_i$ ports available to be connected to the server elements.

Of course, perfect load balance is not possible for all combinations of N and S. For example, if the server comprises three server elements and four network interface circuits (S=3; N=4) perfect balance cannot be guaranteed with the interleaved scheme only. Nevertheless, distributing data carefully among the different server elements will greatly improve the load balance among the switches and server elements.

The presently preferred embodiment distributes data among server elements. The system employs a data structure associated with the media storage devices whereby the media storage devices are organized into stripe groups. The stripe groups are arranged so that a given media selection is assigned to one stripe group and is thereby stored in distributed fashion across the collection server elements.

Figure 4:
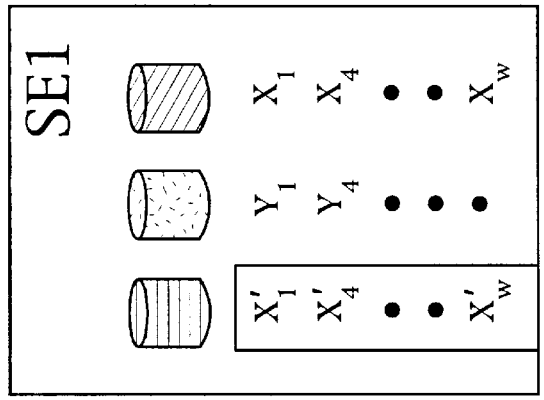
FIG. 4 is a data structure diagram illustrating how media storage devices are organized into stripe groups and how data are distributed among different server elements in accordance with the invention.
Figure 4:
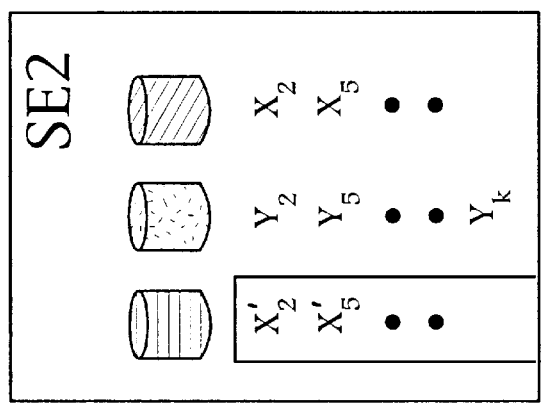
Figure 4:
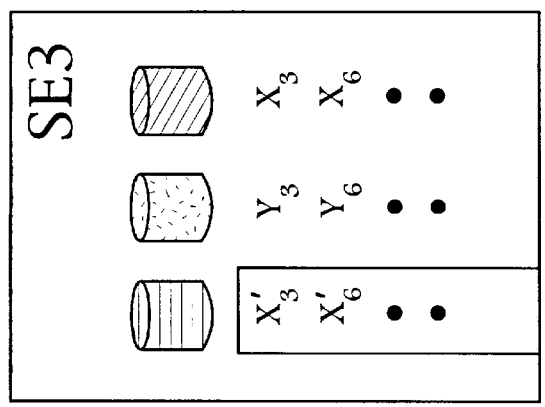

Each media selection comprises sequential blocks of data (e.g., video frames). These blocks are assigned to a stripe group and distributed across all servers in some fashion (e.g., round robin, random, etc.) as illustrated in FIG. 4. In a typical embodiment, each block may correspond to a video frame that represents less than one second of program material. In a typical application video frame may be presented at a rate of thirty frames per second, with each block representing $\frac{1}{30}^{th}$ of a second of program material. Thus, when the media selection is supplied to a user, the server elements appear, to the user, as if all server elements are simultaneously supplying the media selection. For example, the media servers may supply the media selection in round-robin fashion (e.g., each server supplying a different frame in rapid sequence). Of course, different data types may be employed in different server applications. Thus the block size may vary, depending on the application.

Different media objects have different access frequency, as noted above. An object called a hot object has a high access frequency, whereas an object called a cold object is rarely accessed. The server element that stores hot objects encounters more traffic than the servers that do not store hot objects. This can cause a bottleneck in overall system performance. The stripe group arrangement avoids that bottleneck.

Illustrated in FIG. 4, the presently preferred data structure defines a plurality of stripe groups and assigns one or more media storage devices to each stripe group. The stripe groups are distributed across the set of server elements (three server elements are shown in FIG. 4). Disks, which constitute a stripe group, are distributed among different server elements in round-robin fashion.

FIG. 4 illustrates three stripe groups, group A, group B and group C. The media objects corresponding to two media selections are represented as $X_1, X_2, X_3 \ldots ; Y_1, Y_2, Y_3 \ldots$. In round robin fashion, media object $X_1$ is stored in stripe group A on server element SE1. Media object $X_2$ is stored in stripe group A on server element SE2, and so forth. Thus media object $X_4$ is assigned to stripe group A on server elements SE1 as the next round of assignments is made. The media objects comprising media selection Y are assigned to stripe group B, in a similar fashion. In both cases, note how the media objects are evenly distributed across all servers while retaining the same stripe group assignment.

By storing equal portions of each media selection across multiple server elements, a skewed access frequency of different objects does not unbalance the load placed on the server elements. While three server elements and three stripe groups have been illustrated here, the architecture may be readily extended to cover other numbers of stripe groups and other numbers of servers. The number of different streams for a specific media object is dictated by the number of stripe groups (the striping size g) according to the following equation in which DBW refers to the individual disk bandwidth; BW refers to the bandwidth available from a server element and H represents the maximum number of simultaneous streams accessing the same media object.

$$H*BW_1 <= DBW_1 + DBW_2 + \ldots + DBW_g$$

For hot objects that dictate a larger maximum number of simultaneous streams, a second copy of the hot object is made and stored on a different striping group. In FIG. 4, X' represents the second copy of object X. The second copy X' is stored on stripe group C. This way the server can support twice as many different streams for object X.

Figure 5:
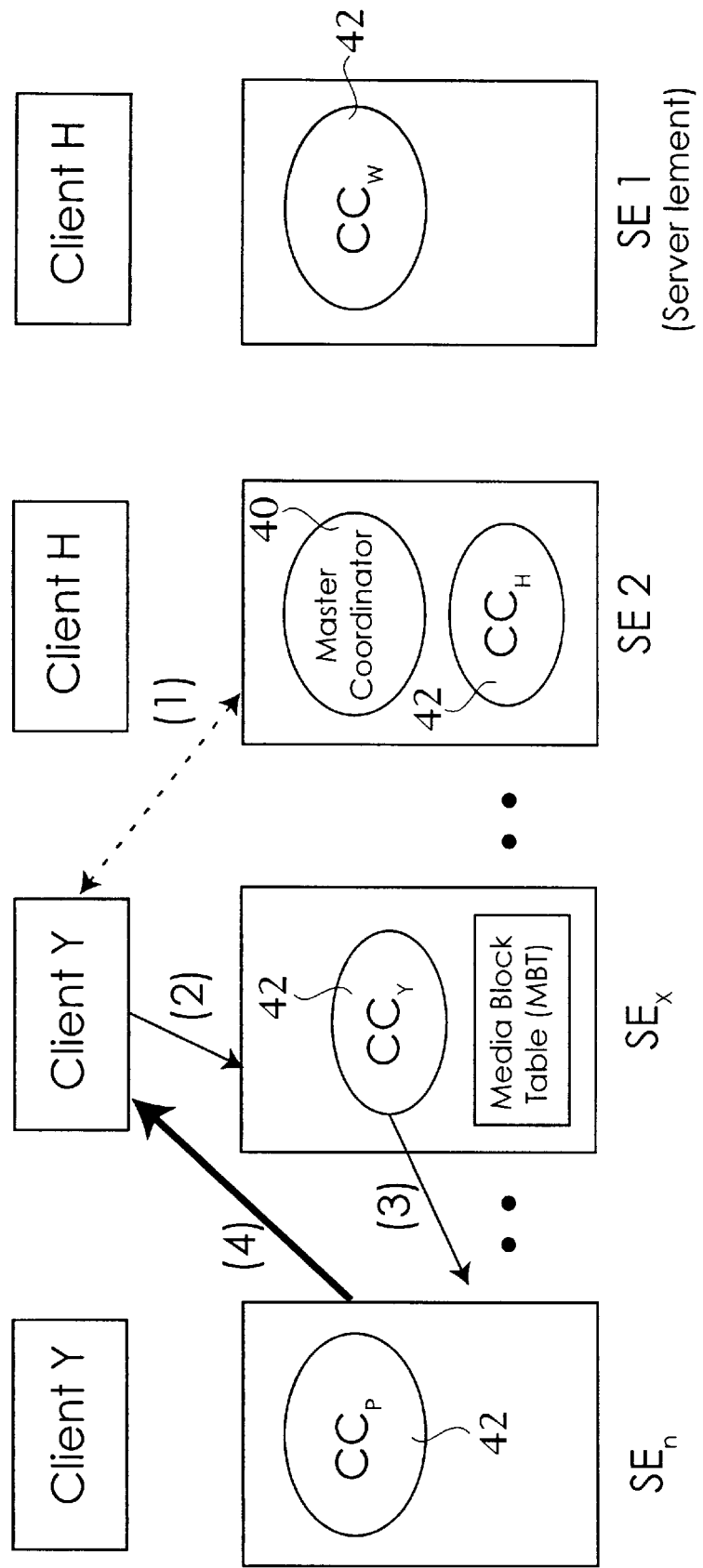
FIG. 5 is a software architecture diagram illustrating message exchange for data transfer using the system of the invention.

A client system communicates with the media server through an admission control process that is mediated by the software system illustrated in FIG. 5. The software system defines a master coordinator 40 which is responsible for admission control and for spawning a client coordinator module to serve the client stream (i.e., write, read, delete, and other like operations) for a given client system.

The master coordinator is the only centralized entity in the distributed media server. Its location is known to all client systems. The master coordinator can be hosted on one of the server elements. In FIG. 5 server element SE2 hosts the master coordinator 40. The master coordinator 40 contains information about the physical location (the server element i.d., media storage device i.d., physical block address) of each block comprising a media object. The master coordinator selects a server element to host a new client coordinator module each time the admission control process is successfully completed. There are as many client coordinator modules in the distributed server system as there are different streams being served.

Client coordinator modules are distributed uniformly among different server elements to avoid bottlenecks. In FIG. 5 the client coordinator modules are illustrated at 42 within each server element. The client coordinator module associated with client Y has been further designated $CC_Y$. The master coordinator includes a rule set to ensure that the load is in balance among different server elements. A client coordinator module is assigned to a server element with the least load.

Recall that the blocks of one media object are striped uniformly among multiple server elements (not necessarily all of them). The client coordinator module associated with a given stream sends control messages to the appropriate server element, causing that server element to send the requested data block directly to the associated client. The control message includes information about the physical location of the block on the media storage device and also the time by which the data must be sent to the client. Advantageously, the data blocks do not go directly through the client coordinator module. This helps avoid bottlenecks.

FIG. 5 shows the sequence of messages exchanged during a data transfer. The messages occur in sequence according to the numbers shown in parentheses on FIG. 5. Accordingly, a message is exchanged as follows:

(1) Client Y sends read request to master coordinator 40, hosted by server element SE2.

(2) If client is admitted, the master coordinator spawns client coordinator module $CC_Y$, in this case assigning it to server element $SE_x$. The master coordinator also sends a media block table (MBT) to server element $SE_x$.

(3) Client Y sends a read request for data block to the client coordinator $CC_y$ directly.

(4) The client coordinator module $CC_Y$ uses the information in the media block table to send control messages to the appropriate server element where the data objects for the requested media selection may be found.

(5) The responding server element $SE_n$ sends the requested data block directly to the client Y.

(6) Steps 3–5 are repeated until all blocks of the requested media selection have been sent to client Y.

From the foregoing it will be understood that the media server of the invention is well adapted for distributed applications where scalability (preferably linear scalability) is required. The server consists of multiple server elements that are connected with each other and with client systems through a high bandwidth network. The stripe group data layout scheme guarantees seamless connection between the users and the distributed server. Each user has the same connection bandwidth to any of the server units. Bottlenecks that might occur at the storage subsystem, due to unbalanced request frequency, are avoided by the stripe group data layout. The system will readily support a mixture of hot and cold media objects, as the stripe group data structure will readily accept additional copies of hot objects.

While the invention has been described in its presently preferred embodiments, it will be understood that certain modifications to the foregoing can be made without departing from the spirit of the invention as set forth in the appended claims.

What is claimed is:

1. A scalable distributed media server, comprising:

a plurality of server elements each having a plurality of network interface circuits and each having a plurality of media storage devices for storing a plurality of media objects representing portions of at least one media selection;

a plurality of switching elements in interleaved connection with said network interface circuits; and a data structure associated with said media storage devices for organizing said media storage devices into stripe groups such that a given media selection is assigned to a stripe group and is thereby stored in distributed fashion across the server elements.

2. A client-server media distribution system according to claim 1 further comprising a plurality of client systems coupled to said switching elements to receive media objects from said server elements.

3. The system of claim 2 further comprising master coordinator coupled to said switching elements for performing admission control with respect to said client systems.

4. The system of claim 3 wherein said master coordinator comprises one of said server elements.

5. The system of claim 2 further comprising at least one client coordinator module for serving a client stream associated with one of said client systems.

6. The system of claim 5 wherein said client coordinator module is hosted by one of said server elements.

7. The system of claim 3 further comprising at least one client coordinator module for serving a client stream associated with one of said client systems.

8. The system of claim 7 wherein said master coordinator initiates the launch of said client coordinator.

9. The system of claim 2 further comprising a client coordinator module for serving a client stream for each client system that is admitted to receive media objects from said server elements.

10. The media server of claim 1 wherein a plurality of said media selections are stored as media objects in said media storage devices of said server elements and wherein a media selection may be stored as multiple copies where demand of a single copy exceeds the bandwidth of the stripe group to which the single copy is assigned.

11. The media server of claim 10 wherein said multiple copies include a first copy and a second copy, each assigned to different stripe groups.

12. The media server of claim 1 wherein said plurality of switching elements includes at least one master switch and a plurality of local switches coupled to said master switch.

13. The media server of claim 1 wherein said given media selection is divided into a plurality of media objects and said media objects are assigned to a common stripe group in each of said plurality of server elements.

14. The media server of claim 1 wherein media selection is broken into blocks distributed in round-robin fashion across said sever elements.

15. The media server of claim 1 wherein said given media selection is divided into a plurality of media objects and said media objects distributed across said server elements such that each server element stores a substantially equal portion of media objects comprising said given media selection.

* * * * *